(12) United States Patent
Sawada (10) Patent No.: US 8,886,447 B2
(45) Date of Patent: Nov. 11, 2014

(54) FUEL EFFICIENCY RANKING METHOD FOR VEHICLE DRIVER AND SYSTEM THEREFOR

(75) Inventor: Osamu Sawada, Chiba (JP)

(73) Assignees: Hyundai Motor Japan R&D Center, Inc., Yokohama (JP); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 637 days.

(21) Appl. No.: 13/095,453

(22) Filed: Apr. 27, 2011

(65) Prior Publication Data

US 2012/0143484 A1    Jun. 7, 2012

(30) Foreign Application Priority Data

Dec. 1, 2010 (JP) ................................. 2010-268248

(51) Int. Cl.

| | |
|---|---|
| *G06F 19/00* | (2011.01) |
| *G06F 7/00* | (2006.01) |
| *G01M 17/00* | (2006.01) |
| *G01M 15/00* | (2006.01) |
| *B60L 3/12* | (2006.01) |
| *G07C 5/00* | (2006.01) |
| *G07C 5/08* | (2006.01) |

(52) U.S. Cl.
CPC ............... *B60L 3/12* (2013.01); *B60L 2250/16* (2013.01); *B60L 2240/12* (2013.01); *B60L 2240/662* (2013.01); *B60L 2240/647* (2013.01); *G07C 5/0816* (2013.01); *G07C 5/008* (2013.01); *B60L 2240/645* (2013.01); *B60L 2240/70* (2013.01); *B60L 2240/667* (2013.01); *Y02T 90/16* (2013.01); *B60L 2240/642* (2013.01)

USPC ........... 701/123; 701/31.2; 701/31.5; 701/54; 701/59; 73/114.41; 73/114.54

(58) Field of Classification Search
USPC ........................... 701/31.2–31.5, 54–59, 123; 73/114.41–114.54
See application file for complete search history.

(56) References Cited

U.S. PATENT DOCUMENTS 6,092,021 A  *  7/2000  Ehlbeck et al. ................ 701/123
6,553,301 B1 *  4/2003  Chhaya et al. .................. 701/54
(Continued)

FOREIGN PATENT DOCUMENTS

| JP | 2002-296040 A | 10/2002 |
|---|---|---|
| JP | 2002-319087 A | 10/2002 |

(Continued)

*Primary Examiner* — James Trammell
*Assistant Examiner* — Majdi Alsomiri
(74) *Attorney, Agent, or Firm* — Edwards Wildman Palmer LLP; Peter F. Corless (57) ABSTRACT

Disclosed is a technique for ranking a driver's fuel efficiency among other drivers based on various variables associated with the environment in which the vehicle is being driven. More particularly, the present invention, selects, as a category, one or more factors affecting fuel efficiency, and, as one or more, variables another one or more. Vehicle data is then collected by a communications device which is associated with a particular trip. Next an average of the fuel efficiencies and an average of the variables for the trip are calculated accordingly the selected one more categories. The fuel efficiency of the trip corresponding to a same category for every coordinate point of the variable is then statistically processed to calculate the average of the fuel efficiency and the standard deviation of the fuel efficiency and regularized (processed as a GAP calculation) to determine the ranking of a vehicle driver.

12 Claims, 8 Drawing Sheets

(56) References Cited

U.S. PATENT DOCUMENTS

| | | | |
|---|---|---|---|
| 7,454,962 B2* | 11/2008 | Nishiyama et al. | 73/114.52 |
| 7,966,121 B2* | 6/2011 | Aoyagi et al. | 701/123 |
| 2009/0109022 A1 | 4/2009 | Gangopadhyay et al. | |
| 2009/0157290 A1* | 6/2009 | Ji et al. | 701/123 |
| 2009/0281715 A1* | 11/2009 | Paik | 701/123 |
| 2009/0326753 A1 | 12/2009 | Chen et al. | |
| 2010/0010732 A1 | 1/2010 | Hartman | |
| 2011/0166773 A1* | 7/2011 | Raz et al. | 701/123 |
| 2012/0004838 A1* | 1/2012 | Lee et al. | 701/123 |
| 2012/0065834 A1* | 3/2012 | Senart et al. | 701/31.4 |
| 2012/0197517 A1* | 8/2012 | Sengoku et al. | 701/123 |
| 2012/0203449 A1* | 8/2012 | Sengoku et al. | 701/123 |

FOREIGN PATENT DOCUMENTS

| | | |
|---|---|---|
| JP | 2002319096 A | 10/2002 |
| JP | 2003051096 A | 2/2003 |
| JP | 2003-208696 A | 7/2003 |
| JP | 2004-251786 A | 9/2004 |
| JP | 2007-100671 A | 4/2007 |
| JP | 2009064254 A | 3/2009 |
| JP | 2010000833 A | 1/2010 |
| JP | 2010-038647 A | 2/2010 |
| JP | 2010-250719 A | 11/2010 |
| JP | 2011-203921 A | 10/2011 |
| KR | 10-0871913 | 1/2008 |
| KR | 10-2010-0029613 | 3/2010 |
| KR | 10-2010-0064133 | 6/2010 |

* cited by examiner

| data center for storing fuel efficiency of vehicle model A | | | | | | | | | storing all trip data of register using vehicle model A |
|---|---|---|---|---|---|---|---|---|---|
| vehicle speed[km/h] \ temperature[°C] | 1 | 2 | 3 | 4 | 5 | ... | 40 | 41 | ... | 100 |
| -40 | 3.5 | 3.8 | 3.9 | 4.5 | 4.8 | | 6.8 | 7.0 | | 9.0 |
| -39 | 3.6 | 3.9 | 4.1 | 4.7 | 5.1 | | 7.1 | 7.5 | | 9.1 |
| -38 | 3.8 | 4.2 | 4.3 | 4.8 | 5.2 | | 7.3 | 7.8 | | 9.8 |
| ... | | | | | | | | | | |
| 0 | 3.8 | 4.1 | 4.2 | 4.5 | 4.8 | | 8.7 | 9.0 | | 10.5 |
| 1 | 4.0 | 4.2 | 4.6 | 4.9 | 5.2 | | 8.9 | 9.3 | | 11.8 |
| 2 | 4.2 | 4.5 | 4.8 | 5.2 | 5.3 | | 9.3 | 9.8 | | 12.1 |
| ... | | | | | | | | | | |
| 20 | 4.5 | 4.5 | 4.8 | 5.2 | 5.3 | | 12.5 | 13.1 | | 15.2 |
| ... | | | | | | | | | | |
| 95 | 3.8 | 3.9 | 4.1 | 4.2 | 4.3 | | 10.0 | 11.5 | | 8.8 |

FIG. 5 data center for storing fuel efficiency of vehicle model A data renewal (standardized processing)

| vehicle speed[km/h] <br> temperature[°C] | 1 | 2 | 3 | 4 | 5 | ... | 40 | 41 | ... | 100 |
|---|---|---|---|---|---|---|---|---|---|---|
| ... | | | | | | | | | | |
| 0 | 3.8 | 4.1 | 4.2 | 4.5 | 4.8 | | 8.7 | 9.0 | | 10.5 |
| 1 | 4.0 | 4.2 | 4.6 | 4.9 | 5.2 | | 8.9 | 9.3 | | 11.8 |
| 2 | 4.2 | 4.5 | 4.8 | 5.2 | 5.3 | | 9.3 | 9.8 | | 12.1 |
| ... | | | | | | | | | | |
| 20 | 4.5 | 4.5 | 4.8 | 5.2 | 5.4 | | 12.6 | 13.1 | | 15.2 |
| ... | | | | | | | | | | |

| ranking | driver | vehicle type | ranking score[GAP] |
|---|---|---|---|
| best | C | Genesis | +10 |
| 2 | D | i30 | +8 |
| 3 | A | SONATA | +5 |
| ... | ... | ... | ... |
| worst | B | Genesis Coupe | -12 |

FIG. 8

FUEL EFFICIENCY RANKING METHOD FOR VEHICLE DRIVER AND SYSTEM THEREFOR

CROSS-REFERENCE TO RELATED APPLICATION

This application claims under 35 U.S.C. §119(a) the benefit of Japanese Patent Application No. 2010-268248 filed Dec. 1, 2010, the entire contents of which are incorporated herein by reference.

BACKGROUND (a) Technical Field

The present invention relates to a method and a system for determining a fuel efficiency ranking for a particular driver of a vehicle. More particularly, it relates to a method and a system for determining the fuel efficiency ranking for a particular driver of a vehicle that allows a driver to consider the differences in various environmental factors relating to the driving of vehicle in addition to particular vehicle models.

(b) Background Art

Due to the recent increases in oil prices and increasing public awareness on eco-friendly environment, vehicle drivers have become more sensitive to fuel efficiency while driving a car. Therefore, it would be useful for a vehicle driver to be able to obtain real time ranking information on fuel efficiency to determine if the way that driver is accustomed to driving is efficient compared to those of other vehicle drivers.

Japanese Patent Application Publication No. 2009-064254 discloses an eco drive monitor for providing information on driving advice including the above-described information in accordance with each driver's requirement.

Fuel efficiency generally depends on various environmental factors in driving that cannot be controlled by a driver's intention or skill other than a driving speed and the vehicle model. Such environmental factors include climate-related environmental factors such as temperature, rainfall, snowfall (e.g., related to the use of air conditioner/heater in a vehicle or the use of 4 wheel drive), etc., and traffic-related environmental factors such as the degree of congested traffic, the number of intersections, the number of traffic lights, the quality of roadway, the kind of roadway such as local roads or highways, etc.

However, conventional systems for fuel efficiency ranking discriminate only between vehicle models without considering other factors, and handle the factors en bloc. Particularly, these systems generally do not consider temperature as an environmental factor, and thus a driver driving a vehicle under a low temperature environment (winter season, cold region) or high temperature environment (summer season, tropical region) cannot fairly evaluate the driver's fuel efficiency in comparison to other drivers and thus he may feel like he is not achieving as good of fuel efficiency in comparison when in actuality he has no control over his current fuel efficiency. Also, there have been often cases where such conventional systems may not give a driver a motivation sufficient for an eco driving.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a technique for ranking fuel efficiency that additionally takes into account environmental factors (including a temperature factor) and traffic factors that cannot be controlled by the driver and as well as the vehicle model and other factors that are associated with calculating a driver's fuel efficiency rating/ranking.

Also, another object of the present invention is to provide a fuel efficiency ranking method capable of considering a plurality of random factors selected from various kinds of factors affecting fuel efficiency and a system therefor.

More specifically, one aspect of the present invention initiates by selecting as a category one or more factors of a plurality of factors affecting fuel efficiency, and as a variable another one or more factors. Vehicle data is then collected by a communications device (which is a device enabling communications between vehicles or between a vehicle and a communication device installed on the road).

This data is associated with the variable and the fuel efficiency of a specific vehicle during a trip (e.g., a point of time which originates when the ignition is turned on and terminates when the ignition off). Next, the communication device calculates an average of the fuel efficiency and an average of the variable to set the average based on the fuel efficiency and one or more variables related to the trip.

A first server at a data center then classifies the fuel efficiency and variable of the trip into a category corresponding to the vehicle driver and stores the data accordingly. Subsequently, a second server also at the data center, upon receiving the classified data statistically processes the fuel efficiency of the trip to associate like categories for every coordinate point for which the variable was applied to calculate an average of the fuel efficiency and a standard deviation of the fuel efficiency. In response to the statistical process completing, the second server then regularizes the fuel efficiency of the trip based on the standard deviation of the fuel efficiency and the average of the fuel efficiency (the regularized fuel efficiency is hereinafter referred to as GAP) and each driver is ranked in the order of magnitude of the accumulated average of the GAP.

In some embodiments, the technique also includes uniformly ranking an accumulated average of GAP of a vehicle driver that corresponds to another category in the order of a magnitude of the accumulated average.

In another embodiment, the factors selected as the category may include one or more of either a vehicle model (vehicle type), distinction between local road and a highway, a region, and a time zone that are related to the current conditions in which the vehicle is driving.

In still another embodiment, the factors selected as a variable may include one or more of either the temperature in which the vehicle is driving in, the level of congested traffic, the number of intersections, and the number of traffic lights through which the vehicles fuel efficiency is currently being effected by.

Advantageously, the above system and method regularizes fuel efficiency in real time (referred to as GAP) to use the GAP as a common indicator, and the system and method may accordingly consider environmental factors (including temperature) and traffic factors, which cannot be controlled by the driver.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 1: engine room | |
| 2: designated short range communications device | |
| 20: communications network | 30: data storing server |
| 40: collection server | 50: various terminals |
| S1: ignition on | S10: collect vehicle data |
| S20: determine whether the ignition is turned on or off | |
| S30: transmit trip data | S40: store data |
| S50: renew data | S60: process ranking |
| S70: transmit ranking data | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
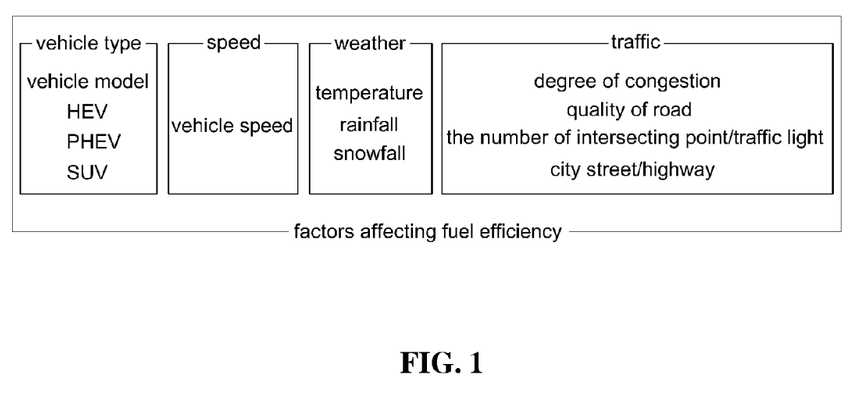
FIG. 1 is a block diagram showing main factors affecting fuel efficiency.

FIG. 1 is a block diagram showing main factors affecting fuel efficiency. In FIG. 1, the first group designates "vehicle type," in more detail, which is classified into vehicle models for each vehicle manufacturer. The vehicle type may be classified into EV (Hybrid Electric Vehicle), PHEV (Plug-in HEV), SUV (Sports Utility Vehicle), etc. using a hierarchical classification in common with manufactures. Such vehicle types are just exemplified but the present invention is not limited to such vehicle types herein.

The second group is related to "vehicle speed," the third group is related to "weather" including "temperature," "snowfall" and "rainfall." The fourth group is related to a traffic including "degree of congested traffic" and "quality of roadway," in addition, the quality of roadway includes the number of intersections, the number of traffic lights, the distinction between local road and highway, etc.

Also, although not shown in FIG. 1, additional classifications may be set as regional classifications such as a national group and/or a local group, and a time zone classification such as time, a day of the week, month, etc.

In the fuel efficiency ranking evaluation of the present invention, all or a part of the above-described factors can be selected as variables. However, hereinafter, the fuel efficiency ranking method and system according to the present invention may be applied to a case where one or more factors among such factors are selected as variables.

In a case where a plurality of variables are selected, an interrelation between factors is considered, for example, a multiple regression analysis is performed, then, main factors are extracted and then reasonable factors (factors other than model type, speed and temperature) for a driver are selected to be set as variables.

In the following embodiment, "model", "vehicle speed" and "temperature" are selected as main factors and data is processed for each vehicle model. For each vehicle model, "fuel efficiency" data is statically processed by setting "vehicle speed" as a first variable and "temperature" as a second variable. Accordingly, even in cases where different factors or three factors or more are set as variables and factors (for example, region) other than vehicle model are selected as a category, the method and system according to the present invention may be applied thereto.

Figure 2:
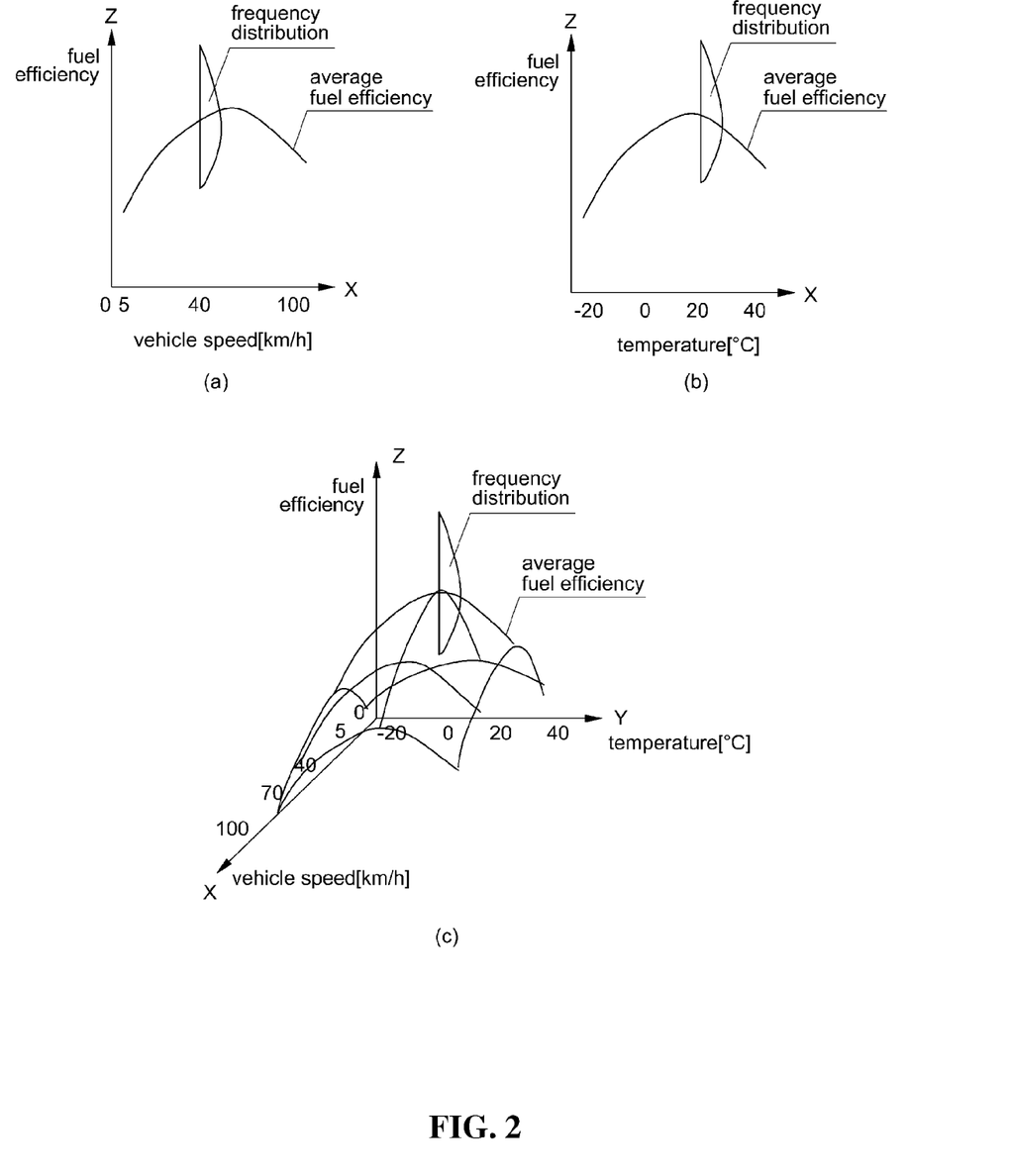
FIG. 2 is graphs showing accumulated data on fuel efficiencies relating to a first variable "vehicle speed" and a second variable "temperature", wherein (a), (b), and (c) show the cases where only the first variable, only the second variable and both the first variable and the second variable are used as independent variables, respectively according an exemplary embodiment of the present invention.

FIG. 2 shows an accumulation of data containing fuel efficiencies for a first variable ("vehicle speed") and the second variable ("temperature"). Average values of "vehicle speed, "temperature" and "fuel efficiency" each, which are calculated from a point of time when a driver turns the ignition on (IGN_ON) to a point of time when a driver turns the ignition off (IGN_OFF) (hereinafter, referred to as trip), are set as unit data. "Fuel efficiency" data for each of a plurality of trips of a plurality of drivers is accumulated to include the associated "vehicle speed" and "temperature" for every driver and trip thereby obtaining as a frequency distribution. The resultant average values and standard deviation values are then calculated, accordingly. In FIG. 2, the frequency distribution is partly shown as an example, the average values only are plotted, but the standard deviation is not plotted for simplicity.

FIGS. 2 (a) and (b) show only the first variable (X, vehicle speed) and only the second variable (Y, temperature) as an independent variable, respectively, and the plot of the average values is formed in a curve shape. FIG. 2 (c) shows both of the first variable and second variable as independent variables and the plot of the average values is formed in a curved surface. If the frequency distribution in FIG. 2 (c) is accumulated along the X axis and Y axis, the resultant distributions along the X axis and Y axis become the frequency distribution in FIG. 2 (b) and frequency distribution in FIG(a), respectively. Accordingly, the average values and standard deviation can be obtained.

Figure 3:
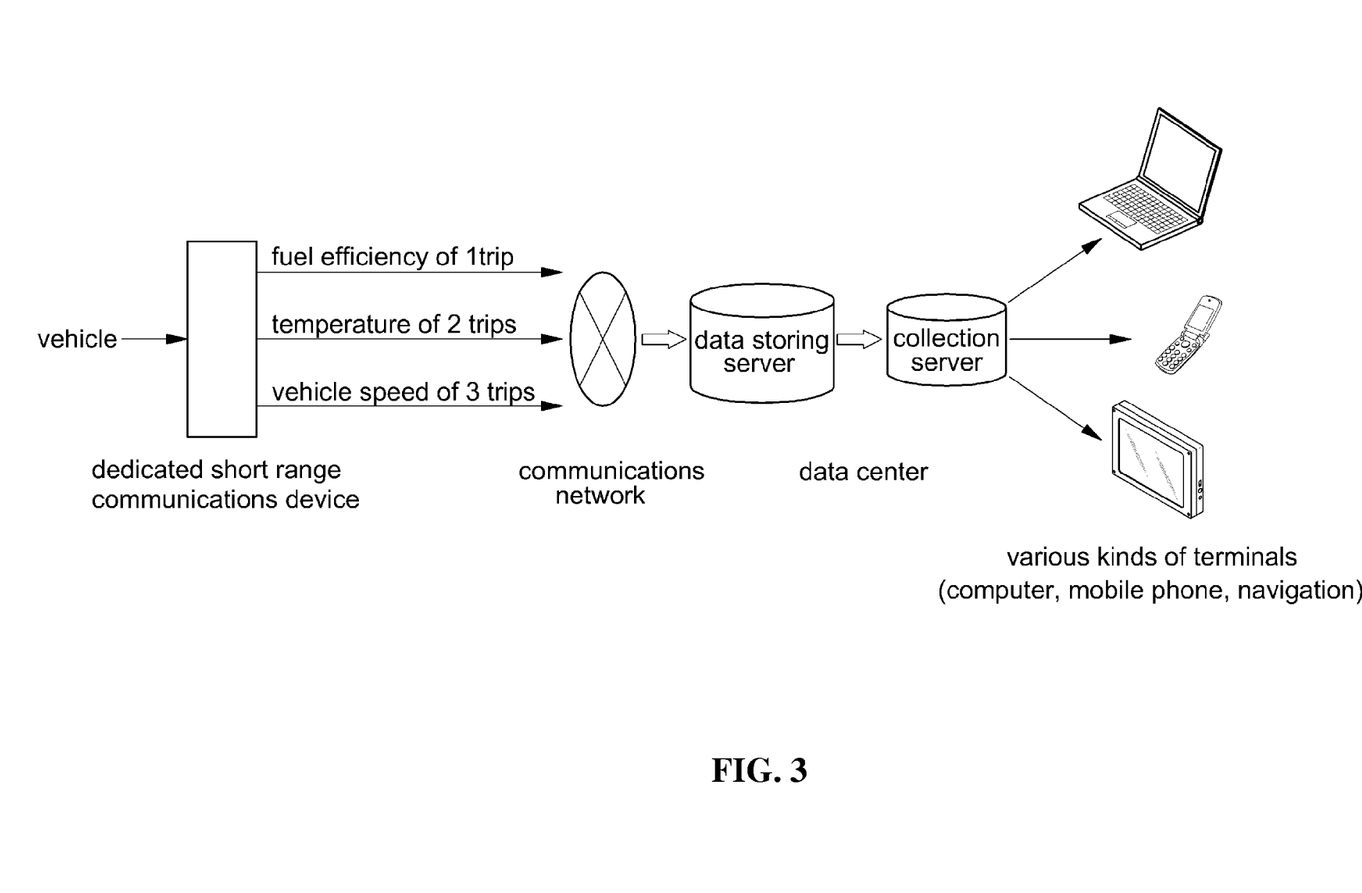
FIG. 3 is a view showing a system for ranking fuel efficiency according to an exemplary embodiment of the present invention.
Figure 4:
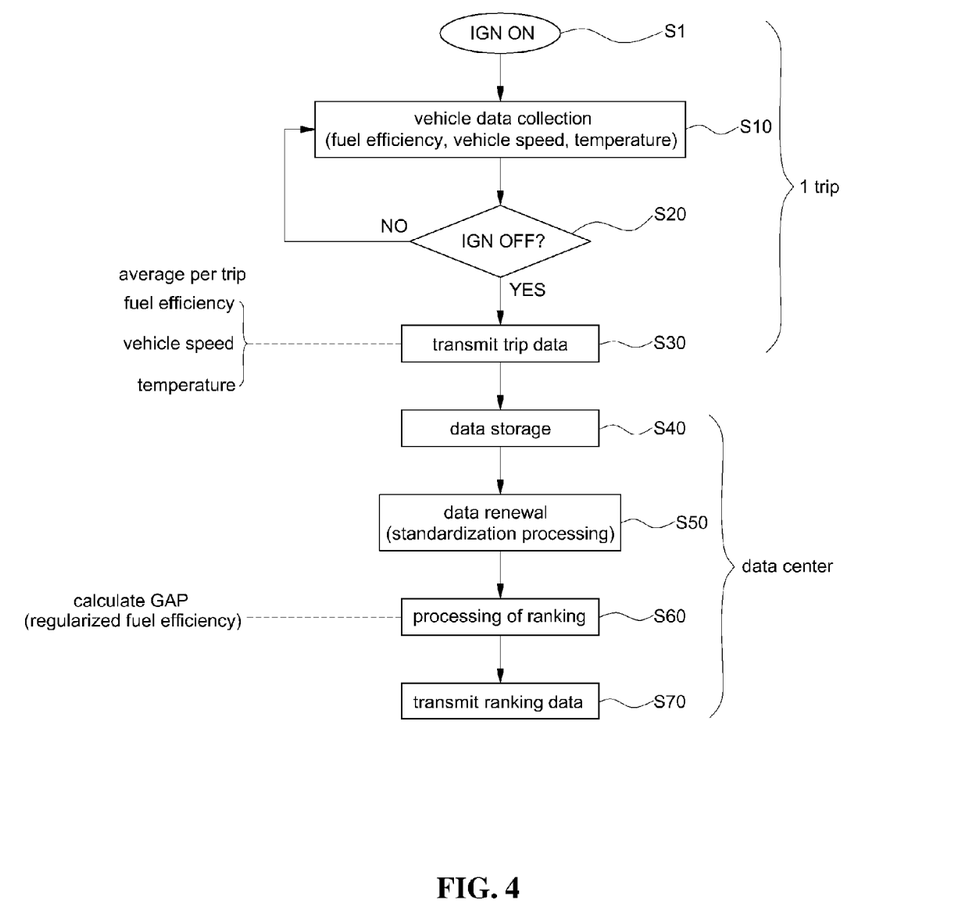
FIG. 4 is a flow chart illustrating a method for ranking fuel efficiency according to an exemplary embodiment of the present invention.

FIG. 3 and FIG. 4 are flow charts showing the system and method for ranking fuel efficiencies according to the illustrative embodiment of the present invention.

As shown in FIG. 3 and FIG. 4, when a specific driver turns the ignition on to start driving a vehicle 1 (Step S1), the communication device (e.g., a dedicated short range communications device) 10 mounted in the vehicle collects and processes data concerning fuel efficiency, vehicle speed and temperature every minute for the duration of a trip (Step 10). Once the trip is finished (if YES at step 20), the exemplary dedicated short range communications device calculates average data based on fuel efficiency, vehicle speed and temperature during the trip, and attaches, to the average data, one or more ID codes of the driver and vehicle as fuel efficiency, vehicle speed and temperature that are associated with that trip thereby transmitting the data to the data center through the communications network 20 (Step 30).

The data storing server 30 of the data center determines the vehicle model based on the received ID codes, stores the fuel efficiency, vehicle speed, and temperature of the corresponding trip in a block associates with that particular vehicle model on the data storing server 30, and renews data accumulated in the block of the corresponding vehicle by adding the corresponding trip data (Step 40).

The collection server 40 of the data center renews as a frequency distribution of fuel efficiency the accumulated data corresponding to the related temperature and the related vehicle speed among the accumulated data of a block of the corresponding vehicle model shown in FIG. 2(c), and recalculates (e.g., through a standardization processing) "average values of fuel efficiencies" and "standard deviation of fuel efficiencies" (Step 50). The collecting server 40 of the data center then regularizes the corresponding fuel efficiencies according to the following equation, which is referred to as GAP.

GAP=(corresponding fuel efficiencies−average values of fuel efficiencies)/(standard deviation of fuel efficiencies)

The collecting sever 40 of the data center stores the previous GAP value of a previous driver in a GAP list prepared for each trip, and calculates the accumulated average values of GAP (for example, simple average in a case of a short term and weighted average focused on the most recent case for a long term) for a predetermined term (e.g., trip, day, week, month, year, etc.) whenever the GAP value is obtained for each trip thereby renewing the GAP list. The renewal should be performed for all other driver's GAP values as well as a corresponding driver's GAP value.

The latest GAP list obtained thus is listed in the order of the GAP values. Based on the order in which the driver's GAP value appears on the list, a driver is assigned a ranking evaluation. The collecting server 40 of the data center then transmits the resultant ranking evaluation to various kinds of driver designated terminals 50 via the communications network (Step 70). The ranking evaluation may be conducted by using a GAP list according to a category, i.e., a particular vehicle model. But it can be also conducted by using an integrated GAP list of all of the vehicle models.

The previously described embodiments of the present invention will now be described with reference to detailed numerical values for exemplary purposes only. Furthermore, it is assumed that a corresponding driver (Referred to as Mr. A) has performed two trips during a day and in Trip 1 the vehicle has an average vehicle speed of 5 km/h, an average temperature of 20° C., and an average fuel efficiency of 5.8 km/L. In Trip 1, if the average value of fuel efficiency renewed during trip 1=5.3 km/L, and the standard deviation of fuel efficiency=0.8, the GAP1=(5.8−5.3)/(0.8)=0.625.

Additionally, in Trip 2 the vehicle has an average vehicle speed of 5 km/h, an average temperature of 20° C., and an average fuel efficiency of 5.6 km/L. In this case, if the average value of fuel efficiency renewed during Trip 2=5.3 km/L, and standard deviation of fuel efficiency=0.8, then the GAP2= (5.6−5.3)/(0.8)=0.375. In this example, the GAP value of Mr. A in the day is 0.500 if the GAP is calculated in a simple average of GAP1 and GAP2.

Figure 5:
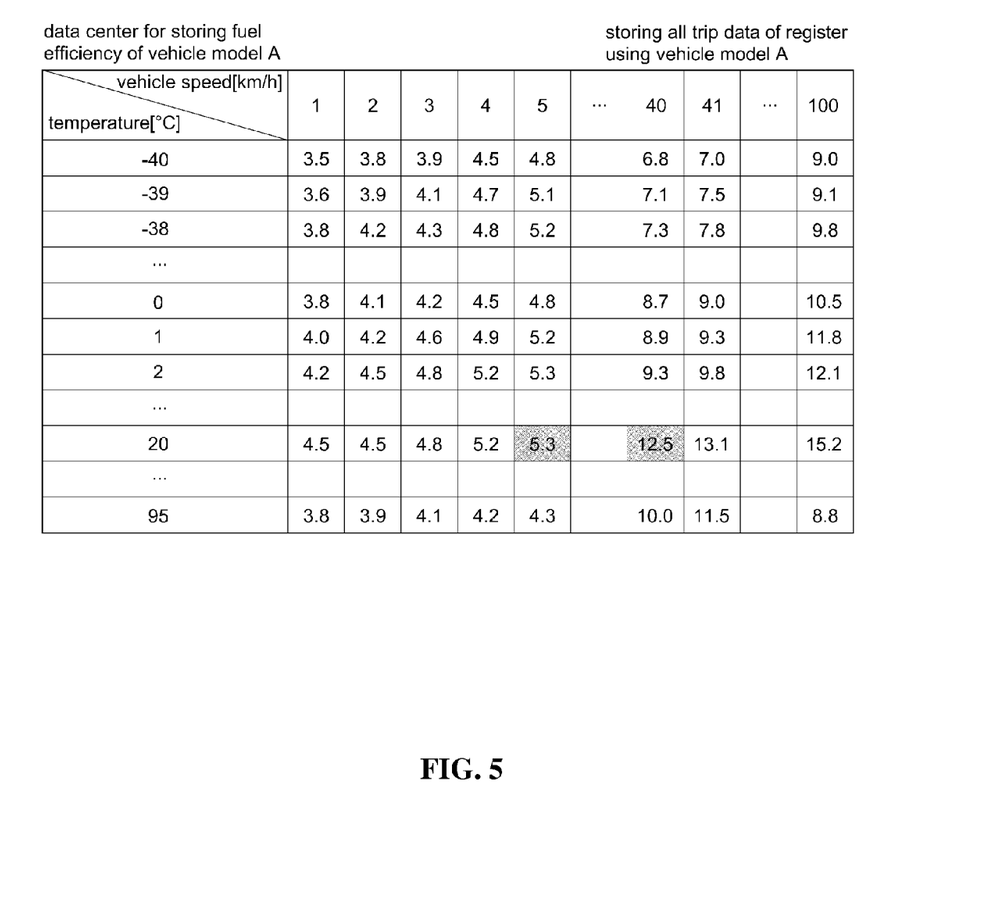
FIG. 5 is a trip data of all drivers of a vehicle model A showing average values of fuel efficiencies in a full range of temperatures and vehicle speeds.

FIG. 5 is trip data of all drivers of a vehicle model A showing average values of fuel efficiencies in a full range of temperatures and vehicle speeds. In the drawing, "average values of fuel efficiencies", which are selected from the trip data of all drivers for the same kind vehicle model as the vehicle A Mr. A drives, are listed by setting the full range of the vehicle speed on a horizontal axis and the full range of temperature on a longitudinal axis. Although not shown in FIG. 5, "standard deviation of fuel efficiency" and "frequency distribution of fuel efficiency" among the trip data of all drivers may also be plotted in the same manner as in the trip data of the drawing.

Figure 6:
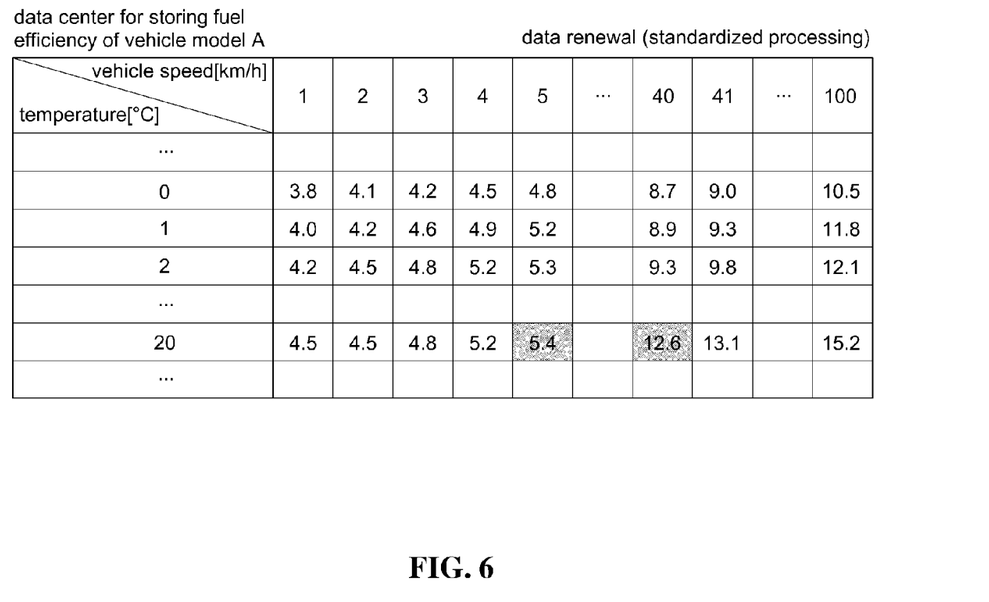
FIG. 6 is a trip data obtained by renewing the data trip shown in FIG. 5 to reflect a trip of a corresponding driver.

FIG. 6 shows the resultant data, in which the Trip 1 and Trip 2 of Mr. A are reflected and "average value of fuel efficiency" is renewed at the corresponding vehicle speed and corresponding temperature compared with FIG. 5.

Figure 7:
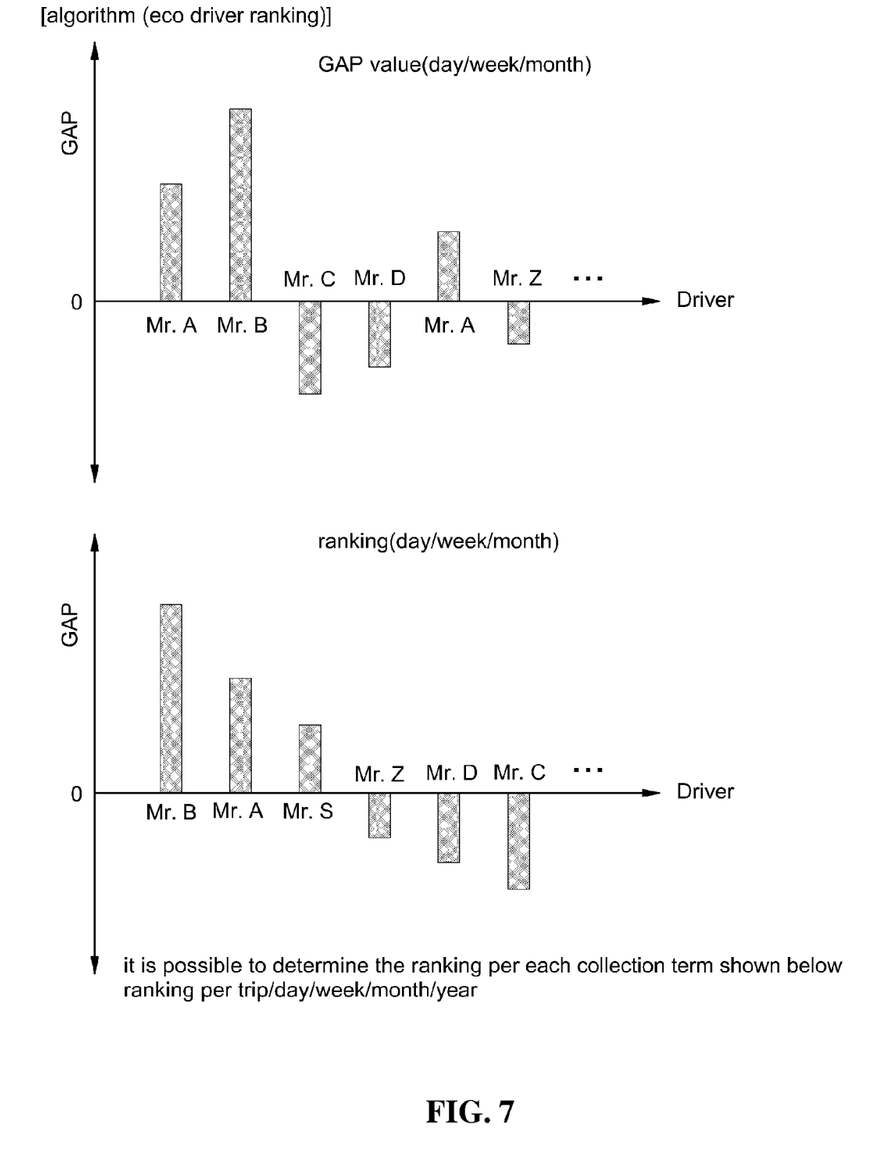
FIG. 7 is graphs showing the latest GAP values renewed based on the trip data shown in FIG. 6.

FIG. 7 shows the latest GAP values renewed based on the data of FIG. 6. In the drawing, the upper drawing is plotted in the order of an enrollment of drivers and the lower drawing is plotted in the order of a magnitude of the latest GAP values. The drawing indicates that Mr. A is ranked second following Mr. B during their respective day travels.

Figure 8:
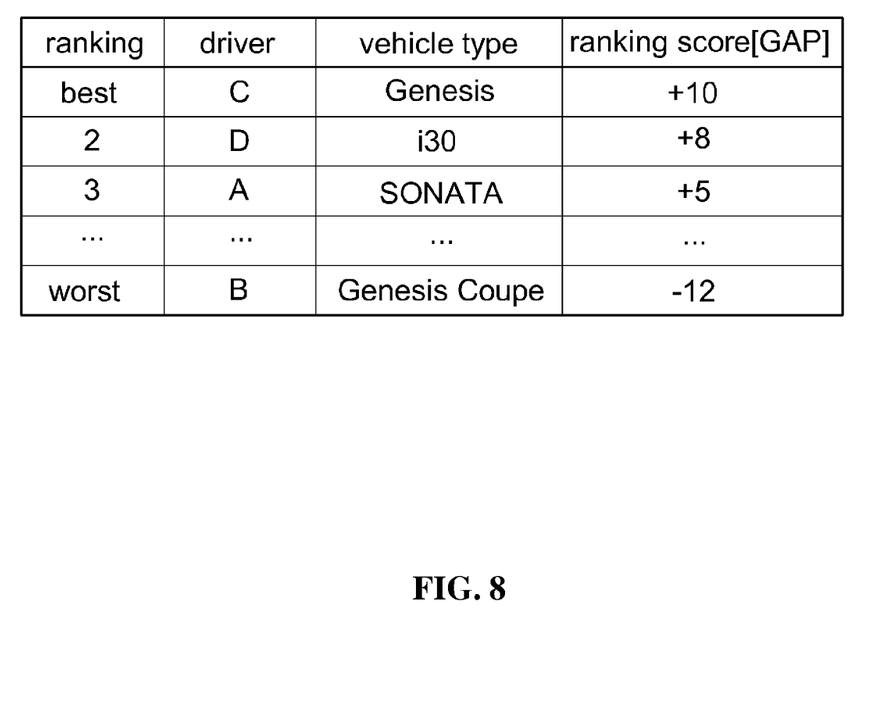
FIG. 8 is a ranking list using GAP values as a common indicator for other vehicle models.

In the some embodiments described in the foregoing, although vehicle models are separately processed and the ranking evaluation of each driver is performed based on the GAP value of each driver for the vehicle model A as a single model, the GAP value obtained may also commonly be used as a simple and fair indicator when a ranking evaluation of each driver for other vehicle models is performed. The detailed numerical values are listed as shown in FIG. 8 as an example. As shown in FIG. 8, common GAP values are listed in the order as a ranking indicator. Accordingly, a driver of other vehicle models (vehicle type) may be evaluated simply and fairly in that ranking order.

Also, in the description of the preferred embodiment, only "vehicle model" is classified as a category, "fuel efficiency" data is processed by setting "vehicle speed" and "temperature" as a first variable and a second variable for each vehicle model, respectively. However, "region" may also be classified as a category together with "vehicle model," or, instead of "vehicle model." That is, the fuel efficiency data may be processed in the same manner as described above, and finally, the GAP value obtained is used as a common indicator of all of the categories thereby enabling a ranking evaluation of all drivers.

Also, instead of "vehicle speed" and "temperature," other vehicle variables may be used as well. For example, "degree of congestion" is converted into numerical value, thereby being used as a first (second) variable. Also, the "degree of congestion" may be used as a third variable in addition to "vehicle speed" and "temperature." In the latter case, although "frequency distribution of fuel frequency", "average value of fuel efficiency" and "standard deviation of fuel efficiency" all become a function of three-dimensional variable for "vehicle speed", "temperature" and "degree of congestion", the data may be processed in the same manner as described above.

What is claimed is:

1. A fuel efficiency ranking method for a vehicle driver, comprising:
   selecting as a category one or more factors and selecting as a variable another one or more factors, among a plurality of factors affecting fuel efficiency;
   collecting, by a communications device, a vehicle data including the variable and the fuel efficiency associated with a trip whenever a specific vehicle driver performs a trip;
   calculating, by the communications device, an average of the fuel efficiency and an average of the variable to set the averages as a fuel efficiency and a variable of the trip upon completion of the trip;
   classifying, by a first server, the fuel efficiency and variable of the trip into the category corresponding to the vehicle driver to store them;
   statistically processing, by a second server, the fuel efficiency of the trip corresponding to the category corresponding to the vehicle driver for every coordinate point of the variable to calculate an average of the fuel efficiency and a standard deviation of the fuel efficiency;
   regularizing, by the second server, the fuel efficiency of the trip based on the standard deviation of the fuel efficiency and the average of the fuel efficiency (hereinafter, the regularized fuel efficiency is referred to as GAP), wherein GAP=(corresponding fuel efficiencies−average values of fuel efficiencies)/(standard deviation of fuel efficiencies);
   ranking, by the second server, each vehicle driver in the order of a magnitude of an accumulated average of the GAP, based on the order in which the corresponding driver's GAP value appears on a GAP list; and
   transmitting, by the communications device, the resultant ranking evaluation to each vehicle driver via a communications network,
   wherein the second server of data center stores a previous GAP value of a previous driver in the GAP list prepared for each trip, and calculates the accumulated average values of GAP for a predetermined term whenever the GAP value is obtained for each trip thereby renewing the GAP list, and
   wherein the renewing is performed for other driver's GAP values and a corresponding driver's GAP value, and a latest GAP lists obtained is listed in the order of the GAP values.

2. The fuel efficiency ranking method according to claim 1, wherein ranking further comprises integrally ranking the accumulated average of the GAP of a vehicle driver corresponding to other categories in the order of the magnitude thereof, wherein the other categories are selected from a group consisting of a vehicle model, distinction between local road and highway, a region, and a time zone.

3. The fuel efficiency ranking method according to claim 1, wherein the one or more factors selected as a category are selected from a group consisting of a vehicle model, distinction between local road and highway, a region, and a time zone.

4. The fuel efficiency ranking method according to claim 1, wherein the one or more factors selected as a variable are selected from a group consisting of temperature, degree of congested traffic, number of crossroads and number of traffic lights.

5. A fuel efficiency ranking system for a vehicle driver that selects as a category one or more factors and, as a variable, one or more factors among a plurality of factors affecting fuel efficiency, the system comprising:
   a dedicated short range communications device configured to collect vehicle data including the variable and the fuel efficiency during a trip whenever a specific vehicle driver performs a trip and configured to calculate an average value of the fuel efficiency and an average value of the variable when the trip is finished to thereby transmit the averages as a fuel efficiency and variable of the trip;
   a data storing server of a data center configured to classify the fuel efficiency and variable of the trip into the category corresponding to the vehicle driver to store them; and
   a collection server of a data center configured to determine the ranking of fuel efficiency based on the variable and fuel efficiency of the trip corresponding to a same category and transmit the result of the ranking to a terminal related to a vehicle driver
   wherein the collection server of a data center statistically processes the fuel efficiency of the trip for every coordinate point of the variable to calculate an average of the fuel efficiency and a standard deviation of the fuel efficiency, and regularizes the fuel efficiency of the trip based on the standard deviation of the fuel efficiency and the average of the fuel efficiency (hereinafter, the regularized fuel efficiency is referred to as GAP), and determines the ranking of vehicle drivers in the order of a magnitude of the accumulated average of the GAP.

6. The fuel efficiency ranking system for a vehicle driver according to claim 5, wherein the collection server integrally determines the ranking of the accumulated average value of the GAP of a vehicle driver corresponding to other categories in the order of the magnitude thereof, wherein the other categories are selected from a group consisting of a vehicle model, distinction between local road and highway, a region, and a time zone.

7. The fuel efficiency ranking system for a vehicle driver according to claim 5, wherein the one or more factors selected as a category are selected from a group consisting of a vehicle model, distinction between local road and highway, a region, and a time zone.

8. The fuel efficiency ranking system for a vehicle driver according to claim 5, wherein the factors selected as a variable are selected from a group consisting of temperature, degree of congested traffic, the number of crossroads and the number of traffic lights.

9. A fuel efficiency ranking system comprising:
   a communications device configured to collect vehicle data associated with a selected variable and a fuel efficiency during a trip, calculate an average value of the fuel efficiency and an average value of the variable when the trip is finished, and transmit the averages as a fuel efficiency and variable of the trip to a remote location;

a first server at the remote location configured to classify the fuel efficiency and variable of the trip into a user selected category corresponding to the vehicle driver; and an second server at the remote location to determining the ranking of fuel efficiency based on the variable and fuel efficiency of the trip corresponding to a same category and transmit the result of the ranking to a terminal related to a vehicle driver to provide the driver with a fuel efficiency ranking which is based on the environment in which the vehicle is currently being driven, wherein the second server statistically processes the fuel efficiency of the trip for every coordinate point of the variable to calculate an average of the fuel efficiency and a standard deviation of the fuel efficiency, and regularizes the fuel efficiency of the trip based on the standard deviation of the fuel efficiency and the average of the fuel efficiency (hereinafter, the regularized fuel efficiency is referred to as GAP), and determines the ranking of vehicle drivers in the order of a magnitude of the accumulated average of the GAP.

10. The fuel efficiency ranking system according to claim 9, wherein the second server integrally determines the ranking of the accumulated average value of the GAP of a vehicle driver corresponding to other categories in the order of the magnitude thereof, wherein the other categories are selected from a group consisting of a vehicle model, distinction between local road and highway, a region, and a time zone.

11. The fuel efficiency ranking system according to claim 9, wherein one or more factors are selected as the category from a group consisting of a vehicle model, distinction between local road and highway, a region, and a time zone.

12. The fuel efficiency ranking system according to claim 9, wherein one or more factors are selected as the selected variable from a group consisting of temperature, degree of congested traffic, the number of crossroads and the number of traffic lights.

\* \* \* \* \*